(12) United States Patent
Matayoshi et al.

(10) Patent No.: US 6,710,129 B2
(45) Date of Patent: Mar. 23, 2004

(54) INJECTION MOLDING SOFT RESIN COMPOSITION AND USERS THEREOF

(75) Inventors: Tomoya Matayoshi, Nagoya (JP); Naoto Yasaka, Ichihara (JP); Tetsuya Nakamura, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/046,738

(22) Filed: Jan. 17, 2002

(65) Prior Publication Data
US 2002/0132956 A1 Sep. 19, 2002

(30) Foreign Application Priority Data

Jan. 17, 2001 (JP) ........................................ 2001-009141

(51) Int. Cl.⁷ ............................. C08F 8/00; C08L 23/00; C08L 23/04; C08L 25/02; C08L 27/10
(52) U.S. Cl. ........................ 525/191; 525/209; 525/216; 525/232; 525/238; 525/240; 525/241
(58) Field of Search ................................. 525/191, 209, 525/216, 232, 238, 240, 241

(56) References Cited

U.S. PATENT DOCUMENTS 6,403,719 B1 * 6/2002 Tanaka et al. .............. 525/191

FOREIGN PATENT DOCUMENTS

| EP | 0 791 626 | 8/1997 |
| WO | WO97/10295 | 3/1997 |

* cited by examiner

Primary Examiner—Nathan M. Nutter
(74) Attorney, Agent, or Firm—Birch, Stewart, Kolasch & Birch, LLP (57) ABSTRACT

The injection molding soft resin composition of the invention comprises (A) an ethylene/α-olefin copolymer using an α-olefin of 3 to 10 carbon atoms as a comonomer and (B) a thermoplastic elastomer composition obtained by dynamically heat treating a crystalline polyolefin resin and an olefin copolymer rubber in the presence of a crosslinking agent, in a specific ratio. The component (A) has a Shore A hardness of 40 to 95, $MRF_{2.16}$ of 1.0 to 100 g/10 min and a density of 855 to 900 $kg/cm^3$, and the component (B) has a gel content of 30 to 100% and a Shore A hardness of 40 to 95. The injection molded article of the invention comprises the soft resin composition and may have been subjected to painting on its surface. Each of the toy and the daily use miscellaneous article of the invention comprises the injection molded article. According to the invention, there can be provided an injection molding soft resin composition, from which injection molded articles having softness and being excellent in low gloss, mechanical properties such as tensile strength and appearance can be produced with high productivity, and a molded article of the composition, such as a molded article employable as a soft toy or a daily use miscellaneous article. Further, a painted article of an injection molded article, which has excellent adhesion of coating, can be provided.

12 Claims, 5 Drawing Sheets

Fig. 1

Fig. 2 gate side

INJECTION MOLDING SOFT RESIN COMPOSITION AND USERS THEREOF

FIELD OF THE INVENTION

The present invention relates to an injection molding soft resin composition and uses thereof. More particularly, the invention relates to an injection molding soft resin composition which is a polyolefin composition containing an ethylene/α-olefin copolymer and is capable of producing injection molded articles with high productivity, said injection molded articles being excellent in softness, low gloss and hand and being favorably used as soft toys, daily use miscellaneous articles, etc., and the invention also relates to an injection molded article of the composition and a painted article of the injection molded article.

BACKGROUND OF THE INVENTION

Polyolefins, such as a relatively soft ethylene/α-olefin copolymer having a Shore A hardness of 40 to 95, particularly an ethylene/α-olefin copolymer having a Shore A hardness of 40 to 70, are low-crystalline or non-crystalline, and therefore, if they are used alone in the injection molding, the following molding disadvantages are liable to occur.

That is, a period of time necessary for a molten resin charged in a desired mold by injection to reach hardened state enough for withdrawal of a molded article from the mold (said time being referred to as "cooling time" hereinafter) is long; and molding defects such as sink mark and flash occur. A long cooling time means along molding cycle, and this causes lowering of productivity of injection molded articles. Occurrence of molding defects such as sink mark and flash means a high rate of occurrence of defective injection molded articles, and such defects should not be present in the molded articles. Particularly, a low-crystalline soft ethylene/α-olefin copolymer has a low hardening rate, and hence the above-mentioned molding disadvantages are liable to take place.

For the purpose of increasing the hardening rate only, a filler such as an inorganic filler or a resin having a relatively high hardening rate such as high-crystalline polypropylene or polyethylene has only to be added to the low-crystalline or non-crystalline ethylene/α-olefin copolymer. This method, however, has a disadvantage that the softness inherent in the ethylene/α-olefin copolymer is impaired, though the hardening rate of the ethylene/α-olefin copolymer is increased.

A crosslinked olefin thermoplastic elastomer composition comprising an α-olefin copolymer and a polypropylene resin is excellent in softness, heat resistance and low gloss and has a higher hardening rate compared with the ethylene/α-olefin copolymer, when used alone, so that the composition is widely used as a soft polyolefin resin capable of being subjected to injection molding. This composition, however, has low tensile strength, and when the composition is molded into a tubular molded product, the product is easily broken.

Further, any paint or primer showing good adhesion to the ethylene/α-olefin copolymer does not exist, and a molded article produced from the ethylene/α-olefin copolymer is not suitable for uses where painting is indispensable.

Accordingly, there is desired development of an injection molding soft resin composition, from which injection molded articles excellent in low gloss, mechanical properties such as tensile strength and appearance can be produced with high productivity without impairing softness inherent in the low-crystalline or non-crystalline ethylene/α-olefin copolymer, an injection molded article thereof, and further an injection molded article having excellent adhesion of coating.

OBJECT OF THE INVENTION

The present invention is intended to solve such problems associated with the prior art as described above, and it is an object of the invention to provide an injection molding soft resin composition, from which injection molded articles excellent in low gloss, mechanical properties such as tensile strength and appearance can be produced with high productivity without impairing softness inherent in the low-crystalline or non-crystalline ethylene/α-olefin copolymer, and an injection molded article of the composition, e.g., an injection molded article employable as a soft toy or a daily use miscellaneous article.

It is another object of the invention to provide an injection molded article having been subjected to color finish with a paint and showing excellent adhesion of coating.

SUMMARY OF THE INVENTION

The injection molding soft resin composition according to the invention is a composition comprising:
 (A) an ethylene/α-olefin copolymer in an amount of 99 to 5 parts by weight, said copolymer comprising ethylene and an α-olefin of 3 to 10 carbon atoms, and
 (B) a thermoplastic elastomer composition in an amount of 1 to 95 parts by weight, said thermoplastic elastomer composition being obtained by dynamically heat treating a crystalline polyolefin resin (a) and an olefin copolymer rubber (b) in the presence of a crosslinking agent,
 the total of said components (A) and (B) being 100 parts by weight,
 wherein the ethylene/α-olefin copolymer (A) has:
  (i) a Shore A hardness (JIS K 6253) of 40 to 95,
  (ii) a melt flow rate $MFR_{2.16}$ (ASTM D 1238, 190° C., load of 2.16 kg) of 1.0 to 100 g/10 min, and
  (iii) a density (ASTM D 1505) of 855 to 900 kg/m$^3$, and
 the thermoplastic elastomer composition (B) has:
  (i) a gel content of 30 to 100%, and
  (ii) a Shore A hardness (JIS K 6253) of 40 to 95.

The injection molding soft resin composition of the invention desirably has a Shore A hardness (JIS K 6253) of 40 to 95 and a melt flow rate $MFR_{2.16}$ (ASTM D 1238, 190° C., load of 2.16 kg) of 1.0 to 100 g/10 min.

The ethylene/α-olefin copolymer (A) desirably has:
 (iv) a molecular weight distribution (Mw/Mn), as determined by gel permeation chromatography (GPC), of 1 to 3, and
 (v) a ratio ($MFR_{10}/MFR_{2.16}$) of a melt flow rate $MFR_{10}$ (ASTM D 1238, 190° C., load of 10 kg, g/10 min) to the $MFR_{2.16}$ (g/10 min) ranging from 5 to 20.

The ethylene/α-olefin copolymer (A) may be a mixture of two or more kinds of the ethylene/α-olefin copolymers (A).

The injection molded article according to the invention comprises the above-mentioned injection molding soft resin composition.

The injection molded article of the invention may have been subjected to painting on the surface.

The painted article of an injection molded article according to the invention is preferably an injection molded article having been subjected to color finish with a paint, said color finish being made by coating the surface of the above-mentioned injection molded article with a primer comprising a styrene elastomer resin having been graft polymerized with a monomer having an α,β-monoethylenically unsaturated group and then conducting the painting.

The painted article of an injection molded article according to the invention is particularly preferably an injection molded article having been subjected to color finish with a paint, said color finish being made by coating the surface of the above-mentioned injection molded article with a mixture of the primer and a photo polymerization initiator, subjecting the coated surface to UV treatment and then conducting the painting.

Each of the toy and the daily use miscellaneous article according to the invention comprises the above-mentioned injection molded article.

1: injection mold
1a: movable mold
1b: fixed mold
2a: cavity
2b: molded article
3: mold parting face
4: runner
5: gate
6: ejector pin mark
7: veneer plywood

DETAILED DESCRIPTION OF THE INVENTION

The injection molding soft resin composition according to the invention and uses thereof are described in detail hereinafter.

The injection molding soft resin composition of the invention comprises an ethylene/α-olefin copolymer (A) and a thermoplastic elastomer composition (B).

Ethylene/α-Olefin Copolymer (A)

The ethylene/α-olefin copolymer (A) for use in the invention is a non-crystalline or low-crystalline random copolymer comprising ethylene and an α-olefin of 3 to 10 carbon atoms and has a density (ASTM D 1505) of 855 to 900 kg/m$^3$ and a melt flow rate $MFR_{2.16}$ (ASTM D 1238, 190° C., load of 2.16 kg) of 1.0 to 100 g/10 min, preferably 1.0 to 50 g/10 min, more preferably 3.0 to 30 g/10 min. This copolymer (A) is a soft ethylene/α-olefin copolymer having a Shore A hardness (JIS K 6253) of 40 to 95, preferably 45 to 90, more preferably 50 to 90.

In the ethylene/α-olefin copolymer (A), the ratio ($MFR_{10}$/$MFR_{2.16}$) of a melt flow rate $MFR_{10}$ (ASTM D 1238), as measured at a temperature of 190° C. under a load of 10 kg, to the $MFR_{2.16}$ is desirably in the range of 5 to 20.

The ethylene/α-olefin copolymer (A) desirably has a molecular weight distribution (Mw/Mn), as determined by gel permeation chromatography (GPC), of 1 to 3, preferably 1.5 to 3. When the ethylene/α-olefin copolymer (A) having a molecular weight distribution (Mw/Mn) of the above range is used, a composition showing excellent releasability in the injection molding and capable of providing a molded article having low stickiness can be obtained.

The molecular weight distribution (Mw/Mn) was measured in the following manner using Millipore GPC-150C.

A separatory column of TSK GNH HT having a diameter of 72 mm and a length of 600 mm was used, and the column temperature was 140° C. Using o-dichlorobenzene (available from Wako Junyaku Kogyo K.K.) as a mobile phase and 0.025% by weight of BHT (available from Takeda Chemical Industries., Ltd.) as an antioxidant, a sample (concentration: 0.1% by weight, pour: 500 microliter) was moved at a rate of 1.0 ml/min. A differential refractometer was used as a detector. An ethylene/propylene copolymer rubber (EPR) whose molecular weight had been already known was used as a standard sample, and Mw and Mn of the sample were calculated.

The α-olefin to be copolymerized with ethylene is an α-olefin of 3 to 10 carbon atoms, and examples thereof include propylene, 1-butene, 1-pentene, 1-hexene, 1-heptene, 1-octene, 1-nonene, 1-decene and 4-methyl-1-pentene. Of these, propylene, 1-butene, 1-hexene and 1-octene are particularly preferable. These α-olefins are used singly or in combination of two or more kinds.

The ethylene/α-olefin copolymer (A) desirably contains units derived from ethylene in amounts of 80 to 95% by mol and units derived from an α-olefin of 3 to 10 carbon atoms in amounts of 5 to 20% by mol.

The composition of the ethylene/α-olefin copolymer (A) is usually determined by measuring a $^{13}$C-NMR spectrum of a sample obtained by homogeneously dissolving about 200 mg of an ethylene/α-olefin copolymer in 1 ml of hexachlorobutadiene in a sample tube of 10 mm diameter, under the conditions of a measuring temperature of 120° C., a measuring frequency of 25.05 MHz, a spectral width of 1500 Hz, a pulse repetition time of 4.2 sec and a pulse width of 6 μsec.

The ethylene/α-olefin copolymer (A) may contain units derived from other polymerizable monomers in addition to the above-mentioned units, within limits not detrimental to the objects of the invention.

Examples of the ethylene/α-olefin copolymers (A) include an ethylene/propylene random copolymer, an ethylene/1-butene random copolymer, an ethylene/propylene/1-butene random copolymer, an ethylene/1-hexene random copolymer and an ethylene/1-octene random copolymer. Of these, an ethylene/propylene random copolymer, an ethylene/1-butene random copolymer, an ethylene/1-hexene random copolymer or an ethylene/1-octene random copolymer is particularly preferably used. These copolymers may be used in combination of two or more kinds.

In the ethylene/α-olefin copolymer (A), the ratio ($MFR_{10}/MFR_{2.16}$) of a melt flow rate $MFR_{10}$ (ASTM D 1238, 190° C., load of 10 kg) to a melt flow rate $MFR_{2.16}$ (ASTM D 1238, 190° C., load of 2.16 kg) is desirably in the range of 5 to 20.

The ethylene/α-olefin copolymer (A) preferably used in the invention is, for example, a soft ethylene/α-olefin copolymer (Al) which is a non-crystalline or low-crystalline random copolymer comprising ethylene and an α-olefin of 3 to 10 carbon atoms and has a density (ASTM D 1505) of preferably not less than 860 kg/m$^3$ and less than 900 kg/m$^3$ and a melt flow rate $MFR_{2.16}$ (ASTM D 1238, 190° C., load of 2.16 kg) of 1.0 to 100 g/10 min, preferably 3 to 30 g/10 min.

The ethylene/α-olefin copolymer (A) for use in the invention has a crystallinity, as measured by X-ray diffractometry, of usually not more than 40%, preferably 10 to 30%.

The ethylene/α-olefin copolymer (A) (including the copolymer (Al)) can be prepared by a hitherto known process using a vanadium catalyst or a metallocene catalyst (e.g., metallocene catalyst described in WO 97/10295).

The ethylene/α-olefin copolymer (A) is used in an amount of 99 to 5 parts by weight, preferably 99 to 50 parts by weight, more preferably 99 to 70 parts by weight, particularly preferably 99 to 80 parts by weight, based 100 parts by weight of the total of the ethylene/α-olefin copolymer (A) and the thermoplastic elastomer composition (B).

Thermoplastic Elastomer Composition (B)

The thermoplastic elastomer composition (B) for use in the invention has a gel content of 30 to 100% and is a thermoplastic elastomer composition in which the rubber component is partially or completely crosslinked (sometimes referred to as a "partially crosslinked or completely crosslinked thermoplastic elastomer composition" hereinafter) This thermoplastic elastomer composition (B) comprises a crystalline polyolefin resin (a) and an olefin copolymer rubber (b).

The term "partially or completely crosslinked thermoplastic elastomer composition" used herein means a thermoplastic elastomer composition in which a polymer component whose molecular weight is increased and a polymer component whose molecular weight is decreased coexist, said increase of the molecular weight resulting from predominant crosslinking reaction in the competitive reactions of decomposition reaction and crosslinking reaction occurring when a crystalline polyolefin of thermal decomposition type and an olefin copolymer rubber of thermal crosslinking type are thermally reacted with a peroxide, said decrease of the molecular weight resulting from predominant decomposition reaction in the above-mentioned competitive reactions.

The thermoplastic elastomer composition (B) has a Shore A hardness (JIS K 6253) of 40 to 95, preferably 45 to 90, more preferably 50 to 90.

Crystalline Polyolefin Resin (a)

The crystalline polyolefin resin (a) for use in the invention is a homopolymer or copolymer in which the content of an α-olefin of 3 to 10 carbon atoms is in the range of 50 to 100% by mol, and is an olefin plastic which is thermally decomposed to decrease its molecular weight and to increase flowability of the resin when it is mixed with a peroxide and kneaded under heating. Examples of the crystalline polyolefin resins (a) include the following homopolymers and copolymers:

(1) a propylene homopolymer, (2) a random copolymer of propylene and not more than 10% by mol of another α-olefin, (3) a block copolymer of propylene and not more than 30% by mol of another α-olefin, (4) a 1-butene homopolymer, (5) a random copolymer of 1-butene and not more than 10% by mol of another α-olefin, (6) a 4-methyl-1-pentene homopolymer, and (7) a random copolymer of 4-methyl-1-pentene and not more than 20% by mol of another α-olefin.

Examples of the α-olefins include ethylene, propylene, 1-butene, 4-methyl-1-pentene, 1-hexene and 1-octene.

Of the crystalline polyolefin resins (a) mentioned above, preferable are a propylene homopolymer and a propylene/α-olefin copolymer having a propylene content of not less than 50% by mol, and particularly preferable are isotactic polypropylene and a propylene/α-olefin copolymer, such as a propylene/ethylene copolymer, a propylene/1-butene copolymer, a propylene/1-hexene copolymer or a propylene/4-methyl-1-pentene copolymer.

The melt flow rate (ASTM D 1238, 230° C., load of 2.16 kg) of the crystalline polyolefin resin (a) is preferably in the range of 5 to 80 g/10 min, particularly 5 to 20 g/10 min.

In the present invention, the crystalline polyolefin resin (a) has functions of improving flowability of the composition and enhancing heat resistance of the composition.

The crystalline polyolefin resin (a) is used in an amount of 5 to 40 parts by weight, preferably 10 to 30 parts by weight, based on 100 parts by weight of the total of the crystalline polyolefin resin (a) and the olefin copolymer rubber (b). When the crystalline polyolefin resin (a) is used in this amount, a soft resin composition having good flowability and capable of providing an injection molded article having excellent softness can be obtained.

Olefin Copolymer Rubber (b)

The olefin copolymer rubber (b) for use in the invention is an amorphous random elastomeric copolymer comprising ethylene and an α-olefin of 3 to 20 carbon atoms or an amorphous random elastomeric copolymer comprising ethylene, an α-olefin of 3 to 20 carbon atoms and a non-conjugated diene, and is an olefin copolymer rubber which is crosslinked to decrease or lose its flowability when it is mixed with a peroxide and kneaded under heating. Examples of the olefin copolymer rubbers (b) include the following rubbers:

(1) an ethylene/α-olefin copolymer rubber (ethylene/α-olefin (molar ratio)=about 80-95/5-20), and (2) an ethylene/α-olefin/non-conjugated diene copolymer rubber (ethylene/α-olefin (molar ratio) about 50-90/50-10, iodine value=not more than 25).

Examples of the non-conjugated dienes include dicyclopentadiene, 1,4-hexadiene, cyclooctadiene, methylene norbornene and ethylidene norbornene. Of the above copolymer rubbers, preferable are an ethylene/propylene copolymer rubber, an ethylene/propylene/non-conjugated diene copolymer rubber, an ethylene/1-butene copolymer rubber and an ethylene/1-butene/non-conjugated diene copolymer rubber, and more preferable is an ethylene/propylene/non-conjugated diene copolymer rubber. Above all, an ethylene/propylene/ethylidene norbornene copolymer rubber is particularly preferable because an injection molded product of a soft resin composition having a moderate crosslinked structure is obtained.

The Mooney viscosity ($ML_{1+4}$ (100° C.)) of the olefin copolymer rubber (b) is preferably in the range of 10 to 350, particularly 30 to 150.

The iodine value of the olefin copolymer rubber (b), that is an indication of the non-conjugated diene content, is preferably not more than 25. When the iodine value of the olefin copolymer rubber (b) is in this range, a thermoplastic elastomer composition (B) having been partially crosslinked with a good balance or completely crosslinked can be obtained.

The olefin copolymer rubber (b) is used in an amount of 60 to 95 parts by weight, preferably 70 to 90 parts by weight, based on 100 parts by weight of the total of the crystalline polyolefin resin (a) and the olefin copolymer rubber (b).

In the present invention, a rubber other than the olefin copolymer rubber (b) can be used in combination with the crystalline polyolefin resin (a) and the olefin copolymer rubber (b), within limits not detrimental to the objects of the invention. Examples of the rubbers other than the olefin copolymer rubber (b) include diene rubbers, such as styrene/butadiene rubber (SBR), nitrile rubber (NBR) and natural rubber (NR), and a silicone rubber.

Other Components

The thermoplastic elastomer composition (B) for use in the invention may contain a peroxide non-crosslinking type rubber-like material (c) in addition to the crystalline polyolefin resin (a) and the olefin copolymer rubber (b).

The peroxide non-crosslinking type rubber-like material (c) is a hydrocarbon type rubber-like material which is not crosslinked and thereby not decreased in its flowability when it is mixed with a peroxide and kneaded under heating. Examples thereof include polyisobutylene, a butyl rubber, and a propylene/ethylene copolymer rubber and a propylene/1-butene copolymer rubber having a propylene content of not less than 70% by mol. Of these, polyisobutylene and a butyl rubber are preferable from the viewpoints of efficiencies and handling. Particularly, polyisobutylene and a butyl rubber each of which has a Mooney viscosity ($ML_{1+4}$ (100° C.)) of not more than 60 are preferable because they improve flowability of the composition.

In the present invention, the term "crosslinked" means that the average molecular weight of the polymer in the composition is increased as a result of predominant crosslinking reaction in the competitive reactions of decomposition reaction and crosslinking reaction occurring when the polymer is thermally reacted with a peroxide, and the term "decomposed" means that the average molecular weight of the polymer in the composition is decreased as a result of predominant decomposition reaction in the above-mentioned competitive reactions.

The peroxide non-crosslinking type rubber-like material (c) is used, if necessary, in an amount of 5 to 100 parts by weight, preferably 5 to 30 parts by weight, based on 100 parts by weight of the total of the crystalline polyolefin resin (a) and the olefin copolymer rubber (b).

The thermoplastic elastomer composition (B) for use in the invention may contain a mineral oil type softener (d), in addition to the crystalline polyolefin resin (a), the olefin copolymer rubber (b) and the peroxide non-crosslinking type rubber-like material (c).

The mineral oil type softener (d) is, for example, a high-boiling petroleum fraction which is usually used for the purpose of weakening intermolecular force of a rubber in the roll processing of the rubber to facilitate the processing, helping dispersing of carbon black, white carbon or the like or lowering hardness of the vulcanized rubber to increase softness. The petroleum fraction is classified into paraffinic type, naphthenic type and aromatic type.

The mineral oil type softener (d) is used in an amount of 5 to 100 parts by weight, preferably 5 to 80 parts by weight, more preferably 20 to 40 parts by weight, based on 100 parts by weight of the total of the crystalline polyolefin resin (a) and the olefin copolymer rubber (b). When the mineral oil type softener (d) is used in this amount, a soft resin composition having excellent injection moldability and capable of producing an injection molded article of excellent appearance without decreasing heat resistance, tensile properties, etc. can be obtained.

In the present invention, a softener other than the mineral oil type softener (d) can be used if necessary, within limits not detrimental to the objects of the invention. As the softener other than the mineral oil type softener (d), that is used in the invention if necessary, a softener usually used for rubbers is suitable, and examples thereof include:

synthetic petroleum type materials, such as process oil, lubricating oil, paraffin, liquid paraffin, polyethylene wax, polypropylene wax, petroleum asphalt and vaseline;

coal tars, such as coal tar and coal tar pitch;

fatty oils, such as castor oil, linseed oil, rapeseed oil, soybean oil and coconut oil;

waxes, such as tall oil, beeswax, carnauba wax and lanolin;

fatty acids, such as ricinoleic acid, palmitic acid, stearic acid, 12-hydroxystearic acid, montanic acid, oleic acid and erucic acid, and metallic salts thereof;

synthetic polymers, such as petroleum resin, coumarone-indene resin and atactic polypropylene;

ester type plasticizers, such as dioctyl phthalate, dioctyl adipate and dioctyl sebacate; and others, such as microcrystalline wax, liquid polybutadiene or its modification product or hydrogenation product, and liquid Thiokol.

To the thermoplastic elastomer composition (B) for use in the invention, hitherto known additives, such as heat stabilizer, weathering stabilizer, anti-aging agent, antistaticagent, filler, colorant and lubricant, can be added if necessary, within limits not detrimental to the objects of the invention.

Process for Preparing Thermoplastic Elastomer Composition (B)

The thermoplastic elastomer composition (B) for use in the invention can be prepared by dynamically heat treating a blend containing the crystalline polyolefin resin (a), the olefin copolymer rubber (b), and optionally, the peroxide non-crosslinking type rubber-like material (c), the mineral oil type softener (d), etc. in the presence of a crosslinking agent such as an organic peroxide.

Examples of the organic peroxides include dicumyl peroxide, di-tert-butyl peroxide, 2,5-dimethyl-2,5-di-(tert-butylperoxy)hexane, 2,5-dimethyl-2,5-di-(tert-butylperoxy)hexyne-3,1,3-bis(tert-butylperoxyisopropyl)benzene, 1,1- bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butyl peroxybenzoate, tert-butyl perbenzoate, tert-butylperoxyisopropyl carbonate, diacetyl peroxide, lauroyl peroxide and tert-butylcumyl peroxide.

Of these, preferable are 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane and n-butyl-4,4-bis(tert-butylperoxy)valerate, and particularly preferable is 1,3-bis(tert-butylperoxyisopropyl)benzene, from the viewpoints of odor and scorch stability.

In the present invention, the organic peroxide is used in an amount of 0.05 to 3% by weight, preferably 0.1 to 2% by weight, based on 100% by weight of the total of the peroxide crosslinking type olefin copolymer rubber (b) and the peroxide decomposition type olefin plastic (a).

In the partial crosslinking due to the organic peroxide in the invention, there can be added peroxy crosslinking assistants, such as sulfur, p-quinone dioxime, p,p'-dibenzoylquinone dioxime, N-methyl-N-4-dinitrosoaniline, nitrosobenzene, diphenylguanidine and trimethylolpropane-N,N'-m-phenylenedimaleimide, divinylbenzene, triallyl cyanurate, or polyfunctional methacrylatemonomers, such as ethylene glycol dimethacrylate, diethylene glycol dimethacrylate, polyethylene glycol dimethacrylate, trimethylpropane trimethacrylate and allyl methacrylate, or polyfunctional vinyl monomers, such as vinyl butyrate and vinyl stearate.

By the use of the above compounds, homogeneous and mild crosslinking reaction can be expected. Particularly, divinylbenzene is most preferably used in the invention. Divinylbenzene can be easily handled and has good compatibility with the olefin copolymer rubber (b) that is a main component to be crosslinked and the crystalline polyolefin resin (a). Moreover, divinylbenzene has a function of solubilizing the organic peroxide and serves as a dispersant of the peroxide. Hence, a partially crosslinked or completely crosslinked thermoplastic elastomer composition (B) showing homogeneous crosslinking effect due to the heat treatment and having a good balance between flowability and other properties can be obtained.

In the present invention, it is preferable to use the crosslinking assistant or the polyfunctional vinyl monomer in an amount of 0.1 to 3% by weight, particularly 0.3 to 2% by weight, based on the all materials to be crosslinked. When the amount of the crosslinking assistant or the polyfunctional vinyl monomer is in the above range, any crosslinking assistant or polyfunctional vinyl monomer does not remain in the elastomer as the unreacted monomer. Hence, the resulting partially crosslinked or completely crosslinked thermoplastic elastomer composition (B) is free from change of properties due to heat history during the molding process, and besides the composition has excellent flowability.

The term "dynamically heat treating" means to knead the above components in a molten state.

The dynamic heat treatment is carried out using a kneading apparatus, such as an open mixing roll, a closed Banbury mixer, a kneader, a single-screw or twin-screw extruder or a continuous mixer, and it is preferable to carry out the dynamic heat treatment in a closed kneading apparatus. Further, the dynamic heat treatment is preferably carried out in an atmosphere of an inert gas such as a nitrogen gas or a carbon dioxide gas.

It is desirable to conduct the kneading at a temperature at which the half-life period of the organic peroxide used corresponds to less than 1 minute. The kneading temperature is in the range of usually 150 to 280° C., preferably 170 to 240° C., and the kneading time is in the range of usually 1 to 20 minutes, preferably 1 to 5 minutes. The shear force applied during the kneading is determined in the range of usually 10 to $10^4$ sec$^{-1}$, preferably $10^2$ to $10^4$ sec$^{-1}$, in terms of shear rate.

In the present invention, mixing and kneading of the above components are preferably carried out in the following manner. The olefin copolymer rubber (b), the crystalline polyolefin resin (a), and if necessary, the peroxide non-crosslinking type rubber-like material (c), the mineral oil type softener (d), etc. are previously mixed, then homogeneously kneaded and pelletized. Then, the resulting pellets are homogeneously mixed with a divinylbenzene solution of an organic peroxide, and if necessary, a crosslinking assistant and a vulcanization accelerator by a kneading machine publicly known, such as a tumbling Brabender, a V-type Brabender or a Henschel mixer, at a temperature of not higher than 50° C. Then, the mixture is kneaded under the aforesaid conditions.

Thus, the thermoplastic elastomer composition (B) containing the olefin copolymer rubber (b) having been partially or completely crosslinked is obtained.

In the present invention, the term "partially crosslinked thermoplastic elastomer composition" means that the thermoplastic elastomer composition has a gel content, as measured by the following method, of not less than 30% by weight, preferably 30 to 97% by weight, and the term "completely crosslinked thermoplastic elastomer composition" means that the thermoplastic elastomer composition has a gel content of 98 to 100% by weight.

Measurement of Gel Content

About 100 mg of a sample of the thermoplastic elastomer composition is weighed out, then the sample is cut into a cube of 0.5 mm×0.5 mm×0.5 mm, and the cube is immersed in 30 ml of cyclohexane at 23° C. for 48 hours.

Then, the sample is taken out on a filter paper and dried at room temperature for not less than 72 hours until a constant weight is reached.

From the weight of the dry residue, the weight of cyclohexane-insoluble components other than the olefin copolymer rubber component (crystalline polyolefin resin, fibrous filler, filler, pigment, etc.) is subtracted, and the obtained value is taken as "corrected final weight (Y)".

On the other hand, the weight of the olefin copolymer rubber component in the sample is taken as "corrected initial weight (X)".

The gel content (cyclohexane-insoluble content) is calculated from the following formula.

Gel content (% by weight)=(Corrected final weight (Y)/Corrected initial weight (X))×100

The thermoplastic elastomer composition (B) is used in an amount of 1 to 95 parts by weight, preferably 1 to 50 parts by weight, more preferably 1 to 30 parts byweight, particularly preferably 1 to 20 parts by weight, based 100 parts by weight of the total of the ethylene/α-olefin copolymer (A) and the thermoplastic elastomer composition (B). When the thermoplastic elastomer composition (B) is used in an amount of 1 to 95 parts byweight, the resulting soft resin composition has a high hardening rate and can be subjected to injection molding. Hence, from the composition, injection molded articles excellent in low gloss, mechanical properties such as tensile strength and appearance can be produced with high productivity without impairing softness inherent in the low-crystalline or non-crystalline ethylene/α-olefin copolymer. Especially when the thermoplastic elastomer composition (B) is used in an amount of 1 to 50 parts by weight, the tensile strength at break of the resulting composition is increased as compared with the case of using the ethylene/α-olefin copolymer (A) or the thermoplastic elastomer composition (B) alone.

Other Components

To the injection molding soft resin composition of the invention, publicly known additives, such as pigment, heat stabilizer, weathering stabilizer, slip agent, anti-blocking agent, release agent, antistatic agent, filler, nucleating agent and colorant, can be added in addition to the ethylene/α-olefin copolymer (A) and the thermoplastic elastomer composition (B), within limits not detrimental to the objects of the invention.

Examples of the fillers include carbon black, asbestos, talc, silica and silica-alumina.

Preparation of Injection Molding Soft Resin Composition

The injection molding soft resin composition of the invention is prepared by melt mixing the ethylene/α-olefin copolymer (A), the thermoplastic elastomer composition (B) and the additives optionally used by various methods hitherto known.

That is, the injection molding soft resin composition of the invention is obtained by a process comprising introducing the components simultaneously or successively into, for example, a Henschel mixer, a V-type blender, a tumbling mixer or a ribbon blender, mixing them and then melt kneading the mixture in a kneading apparatus, such as a single-screw extruder, a multi-screw extruder, a kneader or a Banbury mixer.

By the use of a kneading apparatus showing excellent kneading performance, such as an extruder, a kneader or a Banbury mixer, a soft resin composition in which the components are homogeneously dispersed is obtained.

In any stage of the above process, the aforesaid additives such as an antioxidant can be added, if desired.

The injection molding soft resin composition obtained as above desirably has, on the whole, a Shore A hardness (JIS K 6253) of 40 to 95, preferably 45 to 90, and a melt flow rate $MFR_{2.16}$ (ASTM D 1238, 190° C., load of 2.16 kg) of 1.0 to 100 g/10 min, preferably 1.0 to 50 g/10 min, more preferably 3.0 to 30 g/10 min.

Injection Molded Article

The injection molded article according to the invention is obtained by injection molding the above-obtained injection molding soft resin composition of the invention into a desired shape.

The injection molded article of the invention may have been subjected to painting on its surface. From the viewpoint of adhesion of coating, the painting is preferably carried out by first coating the surface of the injection molded article with a primer comprising a styrene elastomer resin having been graft polymerized with a monomer having an α,β-monoethylenically unsaturated group and then coating the primer coated surface with a paint using a painting machine such as a spray painting machine. Through such painting, color finish of the injection molded article with a paint is achieved.

The color finish with a paint may be carried out by coating the surface of the injection molded article with a mixture of the primer and a photo polymerization initiator, subjecting the coated surface to UV treatment and then coating the thus treated surface with a paint.

The primer comprising a styrene elastomer resin having been graft polymerized with a monomer having an α,β-monoethylenically unsaturated group is obtained by graft polymerizing a hitherto known styrene elastomer resin, such as a styrene/ethylene/propylene/styrene copolymer, a styrene/ethylene/butylene/styrene copolymer, a styrene/isobutylene/styrene copolymer, a hydrogenated styrene/ethylene/butylene/styrene copolymer or a hydrogenated styrene/isobutylene/styrene copolymer, with a monomer having an α,β-monoethylenically unsaturated group.

Examples of such monomers include:

unsaturated carboxylic acids, such as acrylic acid, maleic acid, fumaric acid, tetrahydrophthalic acid, itaconic acid, citraconic acid, crotonic acid, isocrotonic acid and nadic acid™

(endocis-bicyclo[2,2,1]hept-5-ene-2,3-dicarboxylic acid); and derivatives of unsaturated carboxylic acids, such as malenyl chloride, maleimide, maleic anhydride, citraconic anhydride, monomethyl maleate, dimethyl maleate and glycidyl maleate.

The graft polymerization can be carried out by a graft polymerization process hitherto known.

For example, there are a process comprising melting the styrene elastomer resin and then adding a monomer (graft monomer) having an α,β-monoethylenically unsaturated group to the molten resin to perform graft polymerization and a process comprising dissolving the styrene elastomer resin in a solvent and then adding the graft monomer to the solution to perform graft polymerization.

When the graft polymerization is carried out in the presence of a radical initiator in the above process, the graft monomer such as the aforesaid unsaturated carboxylic acid can be efficiently graft polymerized. In this case, the radical initiator is used in an amount of usually 0.001 to 1 part by weight based on 100 parts by weight of the random copolymer composition. Examples of the radical initiators include an organic peroxide and an azo compound.

The photo polymerization initiator has only to be a compound which generates a radical when irradiated with ultraviolet light, and examples thereof include benzoin, benzoin methyl ether, benzophenone and 3,3,4,4-tetrabenzophenone. The photo polymerization initiator is used in an amount of usually about 0.01 to 10% by weight.

Toy and Daily Use Miscellaneous Article

The toy and the daily use miscellaneous article according to the invention are each the above-described injection molded article of the invention, and may be unpainted or may have been painted.

EFFECT OF THE INVENTION

According to the invention, an injection molding soft resin composition, from which injection molded articles excellent in low gloss, mechanical properties such as tensile strength and appearance can be produced with high productivity without impairing softness inherent in the low-crystalline or non-crystalline ethylene/α-olefin copolymer, and an injection molded article of the composition, e.g., an injection molded article employable as a soft toy or a daily use miscellaneous article, can be provided. The injection molded article may be an unpainted article or a painted article. According to the invention, further, an injection molded article (toy, daily use miscellaneous article) having been subjected to color finish with a paint and showing excellent adhesion of coating can be provided. The injection molded article has high tensile strength, and hence, when the injection molded article is utilized as a toy, there is no danger such that a child bites off and swallows the toy.

EXAMPLE

The present invention is further described with reference to the following examples, but it should be construed that the invention is in no way limited to those examples.

The ethylene/α-olefin copolymers and the thermoplastic elastomer composition used in the examples and the comparative examples are as follows.

Ethylene/α-Olefin Copolymer
- (1) Ethylene/1-octene copolymer (EOR 1) $MFR_{2.16}$ (ASTM D 1238, 190° C., load of 2.16 kg): 11 g/10 min
    Density (ASTM D 1505): 870 kg/m$^3$
    Shore A hardness (JIS K 6253): 70
    Tensile strength at 800% elongation (JIS K 7113): 7 MPa
- (2) Ethylene/1-octene copolymer (EOR 2) $MFR_{2.16}$ (ASTM D 1238, 190° C., load of 2.16 kg): 7 g/10 min
    Density (ASTM D 1505): 865 kg/m$^3$
    Shore A hardness (JIS K 6253): 65
    Tensile strength at 800% elongation (JIS K 7113): 4 MPa
- (3) Ethylene/1-octene copolymer (EOR 3) $MFR_{2.16}$ (ASTM D 1238, 190° C., load of 2.16 kg): 5 g/10 min
    Density (ASTM D 1505): 862 kg/m$^3$
    Shore A hardness (JIS K 6253): 62
    Tensile strength at 800% elongation (JIS K 7113): 2 MPa Thermoplastic Elastomer Composition Crosslinked olefin thermoplastic elastomer composition (TPO)

Preparation

In a Henschel mixer, 25 parts by weight of pellets of a propylene homopolymer, 135 parts by weight of pellets of an oil-extended ethylene/propylene/5-ethylidene-2-norbornene copolymer rubber (copolymer: 75 parts by weight, softener: 60 parts by weight), 0.4 part by weight of an organic peroxide (2,5-dimethyl-2,5-di(tert-butylperoxy)hexane) and 0.6 part by weight of divinylbenzene are placed, and they are sufficiently mixed. Then, the resulting mixture is fed to a twin-screw extruder and dynamically heat treated under the following conditions to obtain pellets of a crosslinked olefin thermoplastic elastomer composition (TPO).

Dynamic Heat Treatment Conditions
    Extruder: ZSK-53 (trademark), manufactured by Werner & Fridel Co., screw diameter: 53 mm
    Preset temperature: C1/C2/C3/C4/C5/D=140/160/180/220/200 (° C.)
    Maximum shear rate: 2800 (1/sec)
    Extrusion rate: 50 kg/hr Properties
    Gel content: 95%
    Shore A hardness (JIS K 6253): 60
    Tensile strength at break (JIS K 7113): 6 MPa
    Tensile elongation at break (JIS K 7113): 500%

Examples 1 and 2

Comparative Examples 1 to 4

From the ethylene/1-octene copolymer (EOR 1) and the thermoplastic elastomer composition (TPO) in the amounts shown in Table 1, pellets of a soft resin composition were prepared using a single-screw extruder having a screw diameter of 40 mm at a resin temperature of about 200° C.

Then, from the soft resin composition, an injection molded sheet having a given thickness of 2 mm was prepared.

In Comparative Example 1, an injection molded sheet having a given thickness of 2 mm was prepared from a soft resin composed of only the ethylene/1-octene copolymer (EOR 1); in Comparative Example 2, an injection molded sheet having a given thickness of 2 mm was prepared from a soft resin composed of only the ethylene/1-octene copolymer (EOR 2); in Comparative Example 3, an injection molded sheet having a given thickness of 2 mm was prepared from a soft resin composed of only the ethylene/1-octene copolymer (EOR 3); and in Comparative Example 4, an injection molded sheet having a given thickness of 2 mm was prepared from only the thermoplastic elastomer composition (TPO).

The resulting sheets were each measured on a Shore A hardness (JIS K 6253) at 100% hardness ratio and a tensile strength at 800% elongation. Further, low gloss of each sheet was observed visually and evaluated based on the following criteria. The results are set forth in Table 1.

Criteria of Low Gloss Evaluation
    AA: The sheet exhibits markedly low gloss.
    BB: The sheet exhibits low gloss.
    CC: The sheet exhibits high gloss.

Moreover, the soft resin compositions, the soft resins and the thermoplastic elastomer composition were each subjected to low-temperature injection molding under the conditions of a resin temperature of 120° C. and a mold temperature of 10° C. to examine shortening of cooling time and presence of molding defects (sink mark, flash). Then, the cooling time and the molding defects were evaluated. The results are set forth in Table 2 and FIGS. 5 to 8.

The cooling time evaluation method (1) and the molding defect evaluation method (2) are described below in detail.

(1) Cooling Time Evaluation Method

The cooling time of a molded article is a period of time for which the mold is left closed until the molded article comes to be in a hardened state sufficient for withdrawal from the mold after the injection of the molten resin into the mold.

The expression "hardened state of the molded article sufficient for withdrawal" means that the molded article is hardened to such an extent that such permanent set of the molded article as deviates from the designing acceptable size does not take place by the external force applied to the molded article or the molded article's own weight when the molded article is withdrawn from the mold. The expression "external force applied to the molded article" used herein means an ejection force applied to the molded article in the mold release by an ejector pin and a force applied to the molded article in the handling immediately after the mold release.

The hardened state of the molded article immediately after the injection molding was evaluated by the following two methods so as to make quantitative judgment. That is, there were evaluated (A) a dimple depth of an ejector pin mark remaining on the molded article after the mold release by an ejector pin (referred to as "dimple depth" simply hereinafter) and (B) a ratio of a hardness of the molded article immediately after the mold release to a hardness of the molded article having been sufficiently hardened at room temperature (said ratio being referred to as "hardness ratio" simply hereinafter).

The dimple depth (A) greatly relates to stickiness and frictional force of the molded article to the mold in the mold release by an ejector pin. As the dimple depth is shallower, mold release is made more smoothly, and this means that the stickiness and frictional force of the molded article to the mold are small.

On the other hand, the hardness ratio (B) indicates degree of progress of hardening of the molded article immediately after cooling. As this ratio comes closer to 100%, hardening of the molded article has proceeded more smoothly, and this means that permanent distortion due to the external force in the handling immediately after the mold release or due to the molded article's own weight hardly takes place.

For the proper evaluation of the cooling time, it is desirable to take both of (A) and (B) into account at the same time. The reason is as follows. When only (A) is good and only (B) is bad, the stickiness of the molded article to the mold becomes small by the use of, for example, a release agent. Therefore, mold release of the molded article by means of the ejector pin is smoothly made and the dimple depth becomes small. However, immediately after withdrawal, the molded article suffers permanent distortion due to the external force in the handling or due to the molded article's own weight because hardening has not proceeded sufficiently. On the other hand, when the hardness ratio (B) is high but the dimple depth (A) is large, permanent distortion hardly takes place after the mold release, because hardening of the molded article has proceeded rapidly. However, if the shrinkage ratio of the molded article is extremely small, a large frictional force is produced between the molded article and the mold during the mold release, and because of the frictional force, the molded article suffers permanent distortion during working of the ejector pin. In either case, such permanent distortion of the molded article should not take place. Accordingly, in order to evaluate the effect of shortening of the cooling time, it is desirable to consider both of (A) and (B) as requisites of withdrawal of the molded article.

Then, the soft resin compositions of Example 1 and 2 and the soft resins of Comparative Examples 2 and 3 were each examined on (A) the dimple depth with cooling time after the injection and (B) the hardness ratio, to evaluate the effect of shortening of the cooling time. Details of the evaluation tests of (A) and (B) including size of the molded article and the injection conditions are described below.

Evaluation Tests of (A) Dimple Depth and (B) Hardness Ratio

Figure 1:
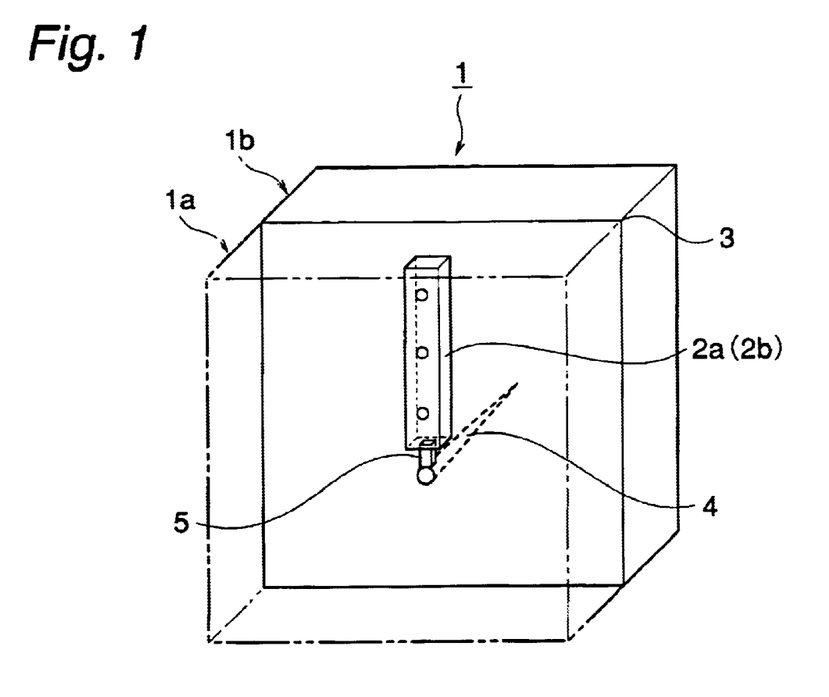
FIG. 1 is a schematic perspective view of an injection mold used for producing a molded article that is used for the evaluation tests of (A) dimple depth and (B) hardness ratio.

As shown in FIG. 1, the injection mold 1 used in the preparation of molded articles for the evaluation tests of the dimple depth (A) and the hardness ratio (B) consists of a movable mold 1a and a fixed mold 1b. The movable mold 1a has a cavity 2a, and the fixed mold 1b is flat. Through the inside of each of the movable mold 1a and the fixed mold 1b, cooling water can pass, and the temperature of the mold 1 can be kept constant. FIG. 1 shows the movable mold 1a and the fixed mold 1b which are closed with each other, and in FIG. 1, numeral 3 designates a mold parting face, numeral 4 designates a runner, and numeral 5 designates a gate.

Figure 2:
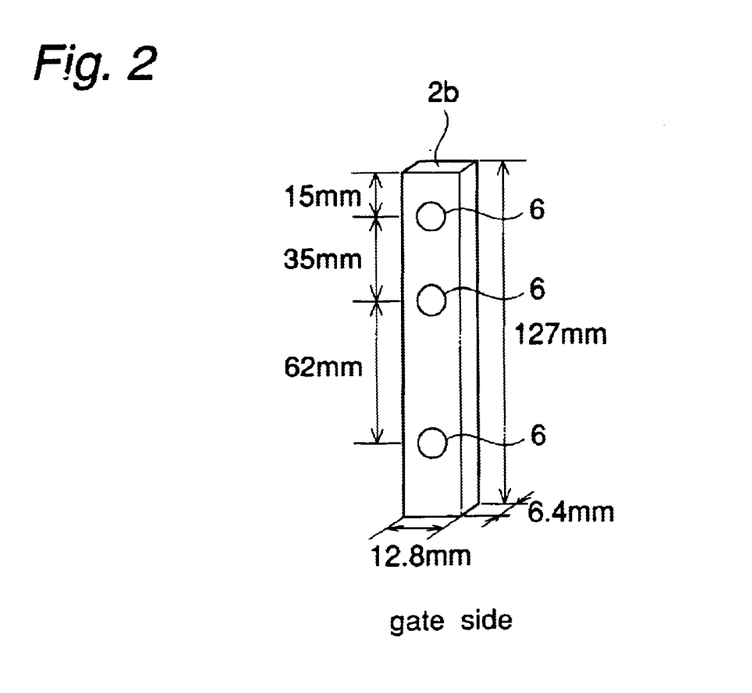
FIG. 2 is a schematic perspective view of a molded article produced by the use of the mold shown in FIG. 1.

As shown in FIG. 2, the molded article 2b obtained from the mold 1 is in a shape of a rectangular parallelepiped having a size of 127×12.8×6.4 mm. After cooling for a given period of time, the movable mold 1a and the fixed mold 1b are opened, and the molded article 2b remains on the side of the cavity 2a. In the subsequent step of mold release, three column-like ejector pins (diameter: 6 mm, not shown) provided on the cavity 2a in the movable mold 1a eject the molded article 2b by a length of about 14 mm at a given rate, to release the molded article 2b from the mold 1a. The positions and shapes of ejector pin marks formed on the molded article 2b are shown in FIG. 2. In FIG. 2, numeral 6 designates an ejector pin mark.

Figure 3:
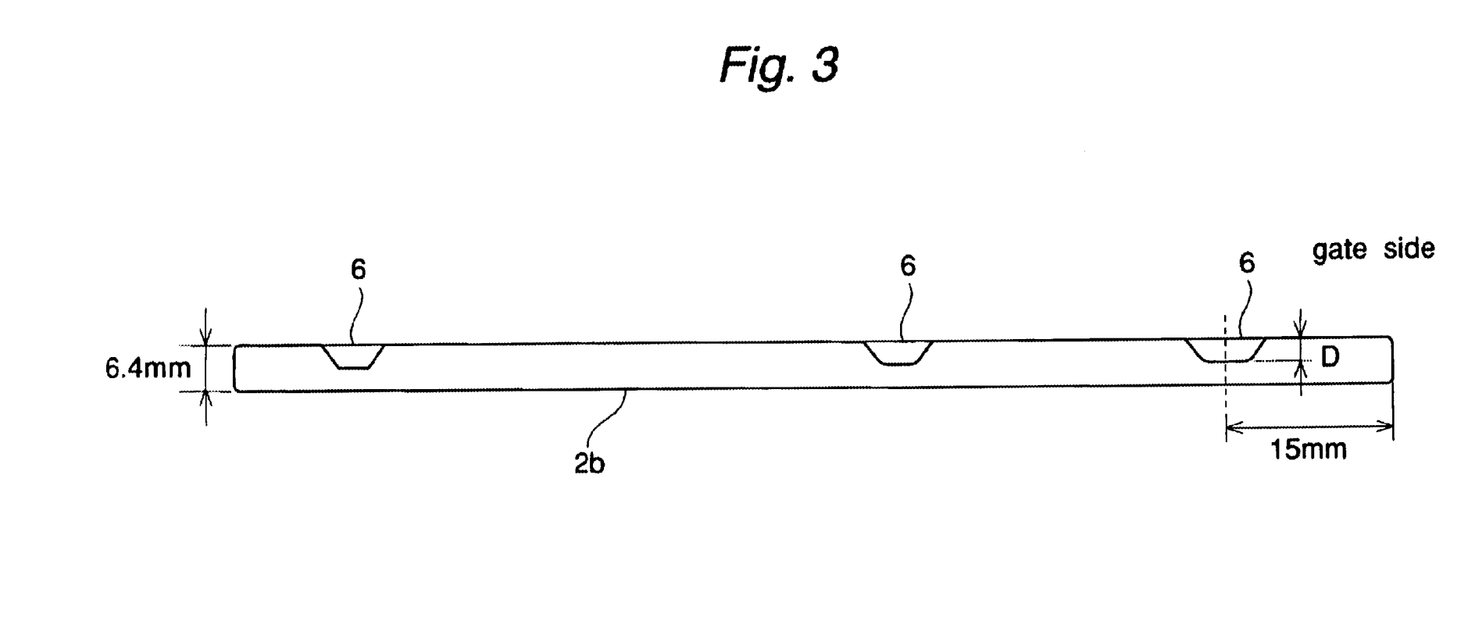
FIG. 3 is a schematic sectional view showing a position to measure a depth of a dimple of the molded article shown in FIG. 2.

In the measurement of the dimple depth, the ejection rate of the ejector pin was set low so as to clarify differences in the dimple depth among the samples. After the mold release, the molded article 2b was allowed to stand for about half a day to a day at room temperature to stabilize the hardened state. Thereafter, the dimple depth D of the injector pin mark 6 positioned nearest to the gate was measured, as shown in FIG. 3.

In the measurement of the hardness ratio, the ejection rate of the ejector pin was set higher than that in the measurement of the dimple depth so as to minimize the influence of the dimple depth. After the molded article 2b was ejected by the ejector pins, the molded article was placed on a veneer plywood 7 of about 10 mm thickness in such a manner that the dimple side faced the plywood. After the lapse of 10 seconds from the ejection of the molded article 2b by the ejector pins, the Shore A hardness at the position indicated by the arrow in FIG. 4 was measured by a simple Shore A hardness meter (manufactured by Kyoto Kobunshi Keiki, trade name: ASKER). This measurement was made while the hardening was rapidly proceeding, so that an instantaneous value that is a value after the lapse of about 1 second from the insertion of a needle of the hardness meter was read out, and the obtained value was taken as a hardness H0. When the hardness given after the hardening has sufficiently proceeded at room temperature is taken as H1, the hardness ratio is determined by the following formula.

Figure 4:
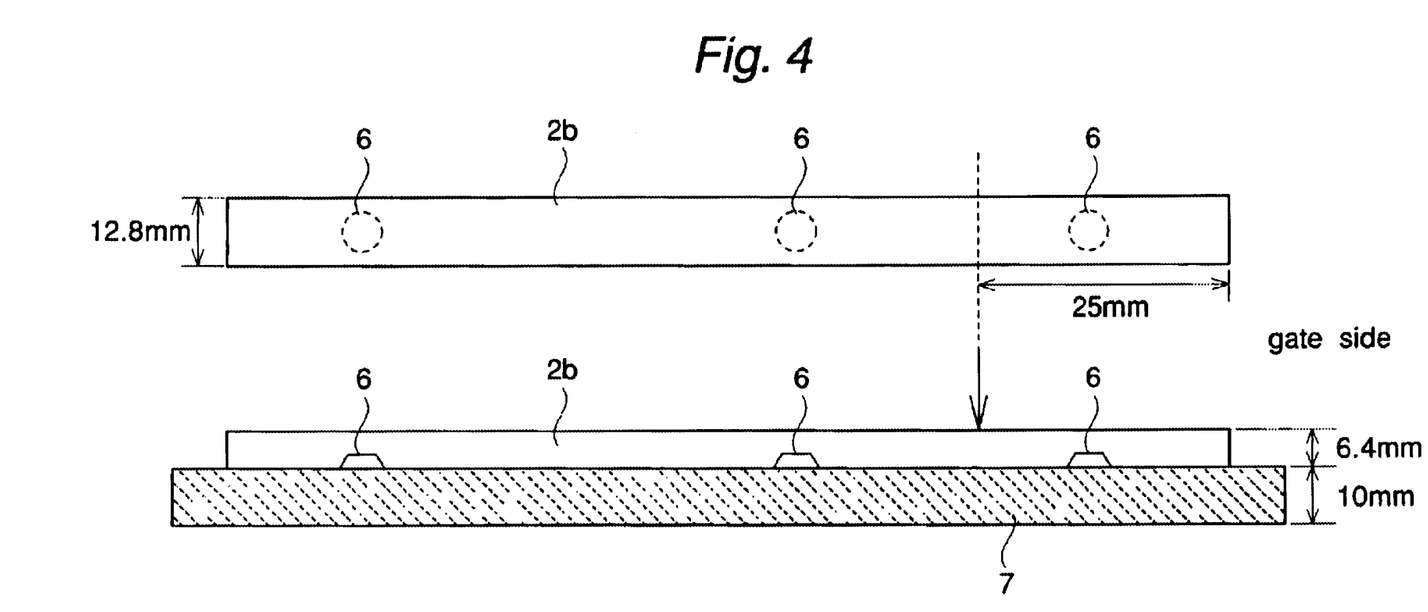
FIG. 4 is a group of a schematic plan view and a schematic sectional view to explain a measuring position of a Shore A hardness of the molded article shown in FIG. 2.
Figure 5:
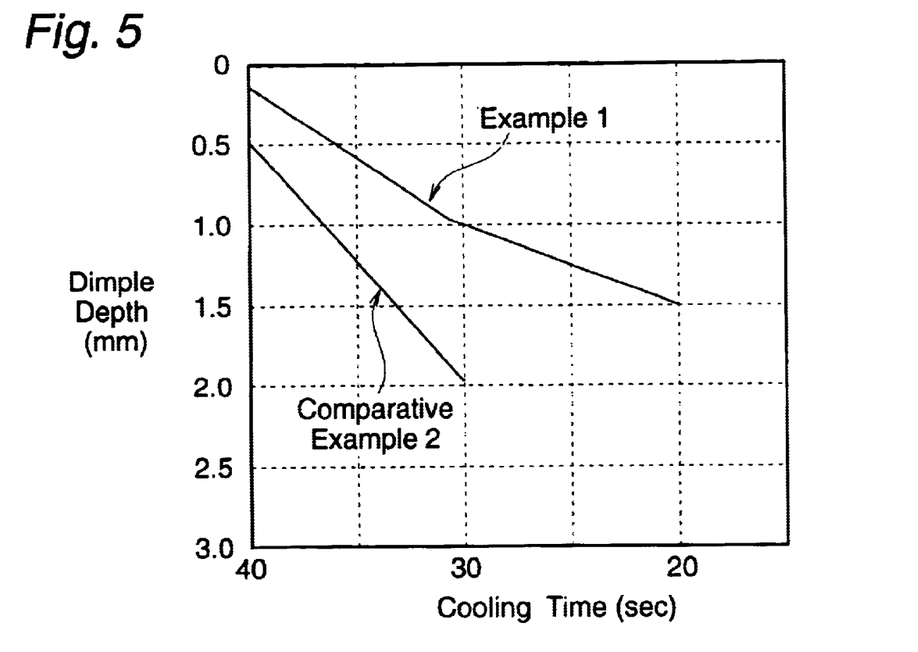
FIG. 5 is a graph showing a relationship between a cooling time and a dimple depth of molded articles of Example 1 and Comparative Example 2, each of said molded articles having a Shore A hardness (at 100% hardness ratio) of 65.
Figure 6:
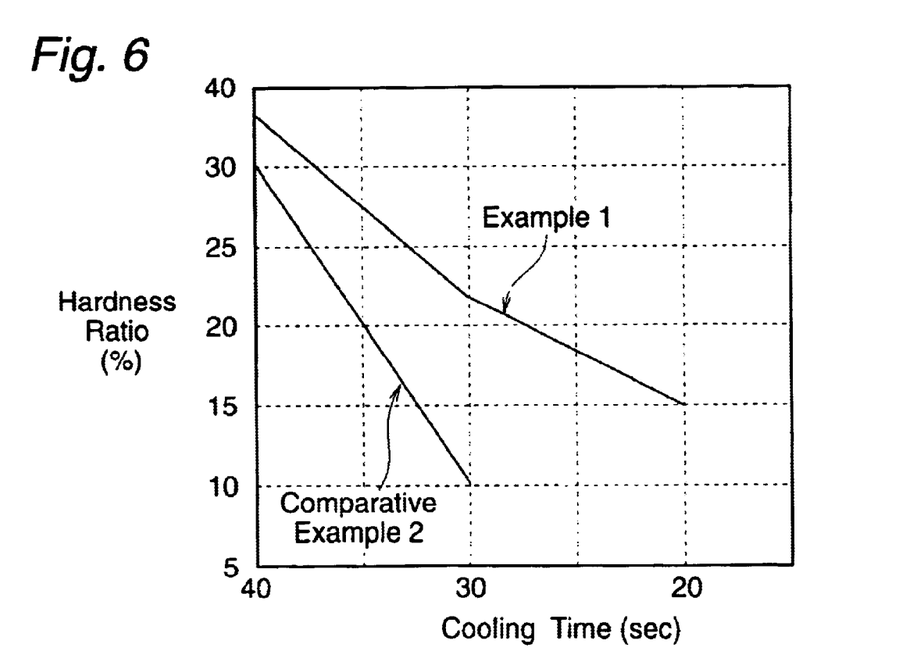
FIG. 6 is a graph showing a relationship between a cooling time and a hardness ratio of molded articles of Example 1 and Comparative Example 2, each of said molded articles having a Shore A hardness (at 100% hardness ratio) of 65.
Figure 7:
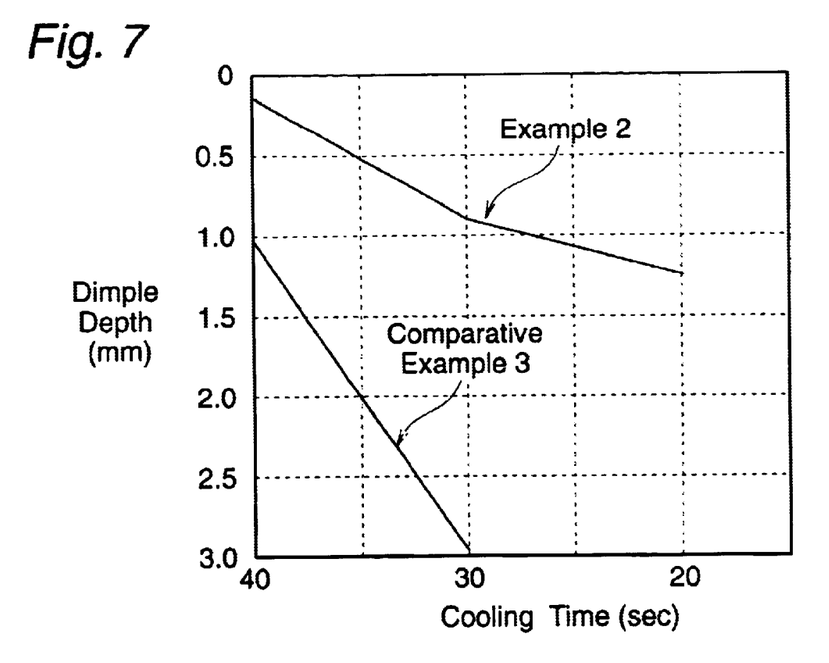
FIG. 7 is a graph showing a relationship between a cooling time and a dimple depth of molded articles of Example 2 and Comparative Example 3, each of said molded articles having a Shore A hardness (at 100% hardness ratio) of 62.
Figure 8:
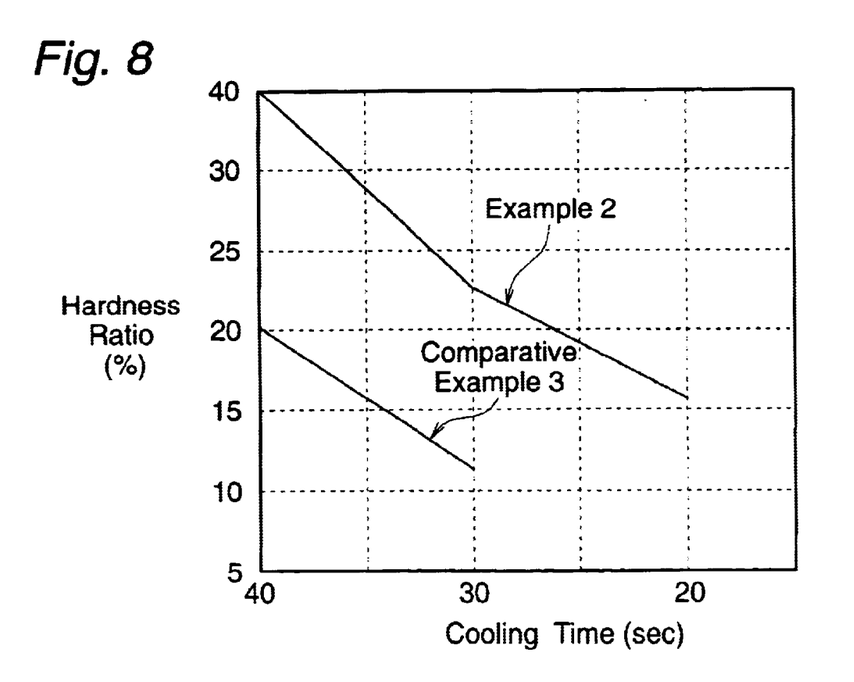
FIG. 8 is a graph showing a relationship between a cooling time and a hardness ratio of molded articles of Example 2 and Comparative Example 3, each of said molded articles having a Shore A hardness (at 100% hardness ratio) of 62.

Hardness ratio (%)=$H1/H0>100$

The injection molding machine and the main molding conditions used for the evaluation are as follows.

Injection molding machine: M-50 AIIDM, manufactured by Meiki Seisakusho, clamp force=50 t.

Cylinder preset temperature:

$H1/H3/H4/H5$=120/120/120/100 (° C.)

Mold temperature: 10° C.
Injection pressure: primary/dwell=25/5 (%)
Injection rate: primary/dwell=20/4 (%)
Metering stroke: 30 mm
Primary/dwell change position: 10 mm
Ejector pin rate:
  Dimple depth measurement: 20% (low rate)
  Hardness ratio measurement: 50% (standard)
  Cooling time: 40 sec, 30 sec, 20 sec, 10 sec (2) Evaluation of molding defects After the mold release, presence of sink mark and flash on the molded article was visually observed.

TABLE 1

|  | Ex. 1 | Ex. 2 | Comp. Ex. 1 | Comp. Ex. 2 | Comp. Ex. 3 | Comp. Ex. 4 |
|---|---|---|---|---|---|---|
| Compounding ratio (part(s) by weight) | | | | | | |
| EOR 1 | 85 | 75 | 100 | — | — | — |
| EOR 2 | — | — | — | 100 | — | — |
| EOR 3 | — | — | — | — | 100 | — |
| TPO | 15 | 25 | — | — | — | 100 |
| $MFR_{2.16}$ of composition or resin (g/10 min) | 7 | 5 | 11 | 7 | 5 | 1 |
| Molded article | | | | | | |
| Shore A hardness HO (at 100% hardness ratio) | 65 | 62 | 70 | 65 | 62 | 60 |
| Tensile strength (MPa) (at 800% elongation) | 11 | 10 | 7 | 4 | 2 | 6(*) |
| Low gloss | BB | BB | CC | CC | CC | AA |

*Since the molded article was broken at an elongation of 500%, a tensile stress at break is set forth.

TABLE 2

|  | Ex. 1 | | Ex. 2 | | Comp. Ex. 2 | | Comp. Ex. 3 | |
|---|---|---|---|---|---|---|---|---|
|  | Dimple depth (mm) | Hardness ratio (%) | Dimple depth (mm) | Hardness ratio (%) | Dimple depth (mm) | Hardness ratio (%) | Dimple depth (mm) | Hardness ratio (%) |
| Cooling time (sec) | | | | | | | | |
| 40 | 0.2 | 38 | 0.2 | 40 | 0.5 | 30 | 1.0 | 20 |
| 30 | 1.0 | 22 | 0.8 | 23 | 2.0 | 11 | 3.0 | 11 |
| 20 | 1.5 | 16 | 1.2 | 16 | — | — | — | — |
| 10 | — | — | — | — | — | — | — | — |
| Occurrence of sink mark and flash | none | | none | | a little | | a little | |

Remarks:
The symbol "—" means unmeasurable because of marked distortion due to the molded article's own weight.

As shown in Table 1, the molded articles of Examples 1 and 2 obtained by the use of a composition composed of the ethylene/1-octene copolymer (EOR 1) and the thermoplastic elastomer composition (TPO) are each superior in the tensile strength properties (at 800% elongation and at break) to the molded article of Comparative Example 1 obtained by the use of only the ethylene/1-octene copolymer (EOR 1), the molded article of Comparative Example 4 obtained by the use of only the thermoplastic elastomer composition (TPO), the molded article of Comparative Example 2 obtained by the use of only the ethylene/1-octene copolymer (EOR 2) having the same $MFR_{2.16}$ and Shore A hardness (at 100% hardness ratio) as those of Example 1, and the molded article of Comparative Example 3 obtained by the use of only the ethylene/1-octene copolymer (EOR 3) having the same $MFR_{2.16}$ and Shore A hardness (at 100% hardness ratio) as those of Example 2.

Further, the molded articles of Examples 1 and 2 are each superior in the low gloss to the molded articles of Comparative Examples 1, 2 and 3 obtained by the use of the ethylene/1-octene copolymer alone.

Next, the evaluation results of the shortening of the cooling time are described.

An ethylene/α-olefin copolymer generally has the properties that with increase of the density, the hardness and the tensile strength are increased and the hardening rate during the course of solidification from the molten state is increased, so that the cooling time in the injection molding is shortened and the molding defects such as sink mark and flash hardly occur.

Accordingly, the effect of the invention was verified with the proviso that the hardness (at 100% hardness ratio) measured after hardening had sufficiently proceeded at room temperature was equivalent. First, a comparison was made between Example 1 and Comparative Example 1 in which the Shore A hardness (at 100% hardness ratio) measured after hardening had sufficiently proceeded was 65. As a result, in the cooling time range of 40 seconds to 20 seconds (at a cooling time of 20 seconds, the distortion due to the molded article's own weight becomes marked), Example 1 had a smaller dimple depth at the same cooling time and a higher hardness ratio at the same cooling time than Comparative Example 2, as shown in Table 2, FIG. 5 and FIG. 6. Likewise, Example 2 wherein the Shore A hardness (at 100% hardness ratio) was 62 had a smaller dimple depth at the same cooling time and a higher hardness ratio at the same cooling time than Comparative Example 2, as shown in Table 2, FIG. 7 and FIG. 8.

Moreover, neither sink mark nor flash was observed in Examples 1 and 2, while some sink marks and flashes were observed in Comparative Examples 2 and 3.

From the above results, it can be said that the injection molding soft resin composition of the invention is an injection molding soft polyolefin resin composition capable of imparting excellent tensile strength and low gloss with maintaining softness inherent in the ethylene/α-olefin copolymer and capable of shortening the cooling time and inhibiting occurrence of molding defects such as sink mark and flash in the injection molding process using a low resin temperature.

What is claimed is:

1. An injection molding soft resin composition comprising:
   (A) an ethylene/α-olefin copolymer in an amount of 99 to 5 parts by weight, said copolymer comprising ethylene and an α-olefin of 3 to 10 carbon atoms, and
   (B) a thermoplastic composition in an amount of 1 to 95 parts by weight, said thermoplastic elastomer composition being obtained by dynamically heat treating a crystalline polyolefin resin (a) and an olefin copolymer rubber (b) in the presence of a crosslinking agent,
   the total of said components (A) and (B) being 100 parts by weight,
   wherein the ethylene/α-olefin copolymer (A) has:
      (i) a Shore A hardness of 40 to 95 measured according to JIS K 6253,
      (ii) a melt flow rate $MFR_{2.16}$ of 1.0 to 100 g/10 min measured according to ASTM D 1238 at a load of 2.16 kg at 190° C., and
      (iii) a density of 855 to 900 kg/m$^3$ measured according to ASTM D1505, and
   the thermoplastic elastomer composition (B) has:
      (i) a gel content of 30 to 100%, and
      (ii) a Shore A hardness of 40 to 95 measured according to JIS K 6253.

2. The injection molding soft resin composition as claimed in claim 1, having a Shore A hardness of 40 to 95 measured according to JIS K 6253 and a melt flow rate $MFR_{2.16}$ of 1.0 to 100 g/10 min measured according to ASTM D 1238 under a load of 2.16 kg at 190° C.

3. The injection molding soft resin composition as claimed in claim 1, wherein the ethylene/α-olefin copolymer (A) has:
   (iv) a molecular weight distribution (Mw/Mn), as determined by gel permeation chromatography (GPC), of 1 to 3, and
   (v) a ratio ($MFR_{10}/MFR_{2.16}$) of a melt flow rate $MFR_{10}$ g/10 min measured according to ASTM D 1238 under a load of 10 kg at 190° C. to the $MFR_{2.16}$ (g/10 min) ranging from 5 to 20.

4. The injection molding soft resin composition as claimed in claim 1, wherein the ethylene/α-olefin copolymer (A) is a mixture of at least two different ethylene/α-olefin copolymers (A).

5. An injection molded article comprising the injection molding soft resin composition of any one of claims 1 to 4.

6. The injection molded article as claimed in claim 5, which has been painted on the surface.

7. The injection molded article as claimed in claim 5, which has been provided with a color finish by painting, said color finish being provided by coating the surface of the injection molded article with a primer comprising a styrene elastomer resin having been graft polymerized with a monomer having an α,β-monoethylenically unsaturated group and then painting the surface.

8. The injection molded article as claimed in claim 5, which has been provided with a color finish by painting, said color finish being provided by coating the surface of the injection molded article with a composition comprising a styrene elastomer resin having been graft polymerized with a monomer having an α, β-monoethylenically unsaturated group and a photopolymerization initiator, subjecting the coated surface to UV treatment and then painting the surface.

9. A toy comprising the injection molded article of claim 5.

10. A toy comprising the injection molded article of claim 6.

11. A toy comprising the injection molded article of claim 7.

12. A toy comprising the injection molded article of claim 8.

* * * * *